J. B. O'DONNELL & W. J. DEVER.
Automatic Car-Brake.

No. 221,345. Patented Nov. 4, 1879.

WITNESSES:
Henry N. Miller
C. Sedgwick

INVENTOR:
J. B. O'Donnell
W. J. Dever
BY Munn & Co
ATTORNEYS.

UNITED STATES PATENT OFFICE.

JAMES B. O'DONNELL AND WILLIAM J. DEVER, OF HAZLETON, PA.

IMPROVEMENT IN AUTOMATIC CAR-BRAKES.

Specification forming part of Letters Patent No. 221,345, dated November 4, 1879; application filed April 21, 1879.

*To all whom it may concern:*

Be it known that we, JAMES BENEDICT O'DONNELL and WILLIAM JOSEPH DEVER, of Hazleton, in the county of Luzerne and State of Pennsylvania, have invented an Improved Self-Acting Car-Brake, of which the following is a specification.

Figure 1:
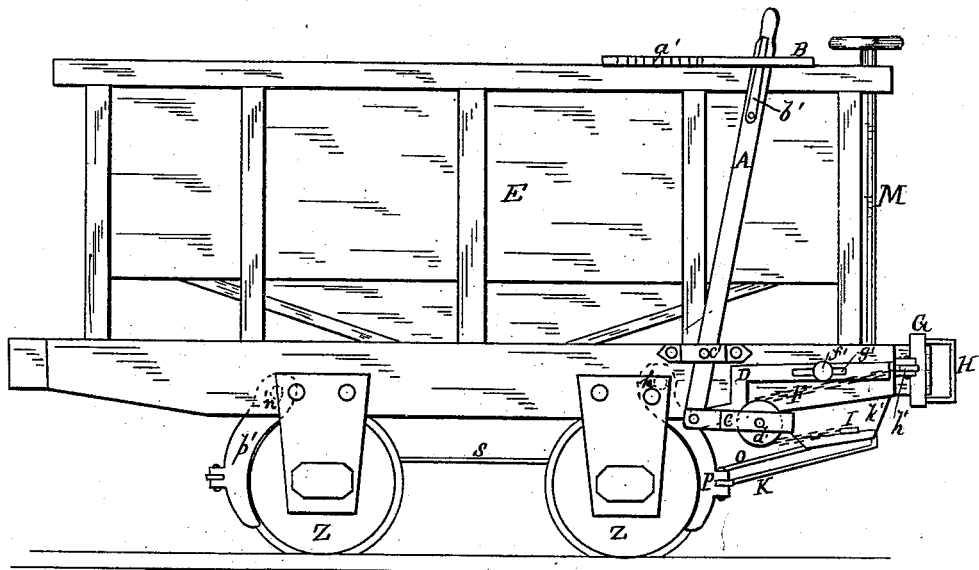
Figure 2:
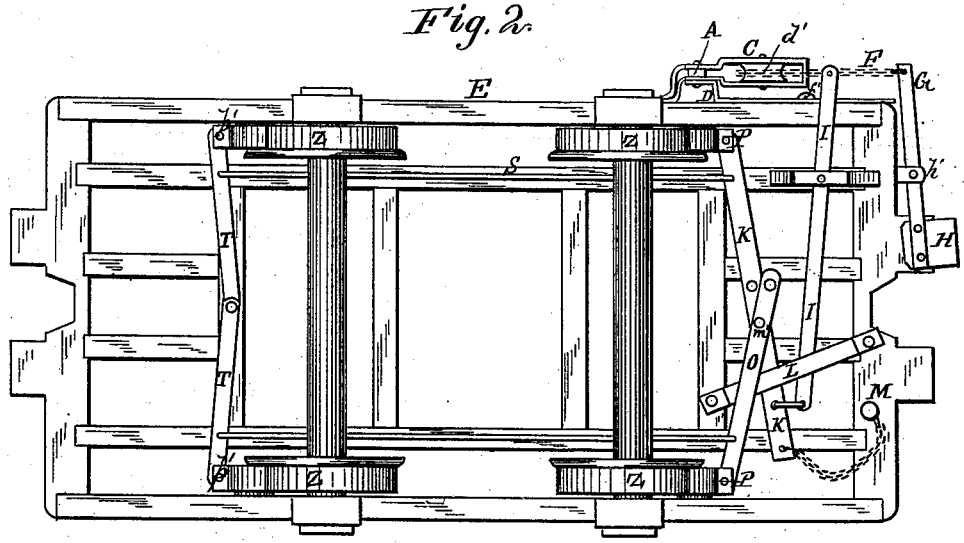

Figure 1 is a side elevation of a coal-car with the brake attached. Fig. 2 is a bottom plan of the car and brake.

Similar letters of reference indicate corresponding parts.

The object of this invention is to furnish a brake that can be easily applied to coal or freight cars, gondolas, oil-cars, and the like, and that shall be operated by the contact of one car with another.

A is a hand-lever, the handle of which is held in position against the ratchet $a'$ by the guiding-clamps B and the spring $b'$. This lever has its fulcrum at $c'$, and to its lower end is attached the pulley-frame C, carrying the sheave $d$ and the bent and slotted pushing-bar D, that is held against a side timber of the car E by a pin or bolt that passes through the slot $g$.

One end of the chain F, that passes over the sheave $d'$, is secured to the handle of the lever G, that is pivoted in the lug $h'$ on the end of the car, while the other end of this lever embraces the movable cap or bumper H. The opposite end of the chain F is secured to the handle of the lever I, that is pivoted in the lug $k'$ on the bottom of the car, and whose other end is linked to one arm of the lever K, that rests in the guide L, and is connected to the perpendicular brake-rod M by the chain N.

The pin $m'$ pins together the levers K and O, so that their movements may be synchronous, their outer ends being fastened to the brake-shoes P P, that are pivoted at $n'$ $n'$. The rods S S connect these levers K and O with two corresponding levers, T T, at the rear of the car in such a manner that the motion of K and O is transmitted through them to T T, whose inner ends are together pivoted at $o'$ on a timber of the car-frame, and whose outer ends respectively connect with brake-shoes $p'$ $p'$, pertaining to the rear wheels.

To operate the device the handle of the lever A is put down or set forward sufficiently to take up the slack of the chain F and throw out the cap or bumper H, as shown in the drawings, and the same movement of A transmitted through F moves the lever I and the connected levers K O and T T so as to set the brake-shoes closely to the rims of the wheels Z Z. In this position the various parts of the device are arranged ready for operating. When the cars come in contact with each other the force of the shock upon the cap or bumper H drives it and the end of the lever G backward, and causes the other levers instantly to seat and hold the brake-shoes against the wheels. When it is desired to arrange the brake so that it will not operate by the contact of the cars with each other, the position of the lever A is reversed—that is, its handle put up or set backward—so that all tension is removed from the chain F, while the pushing-bar D is so thrust forward against the long arm of the lever G as to cause the cap or bumper H to be drawn close in. Arranged in this position the brake will not operate when the cars come in contact with each other; but in whatever position the lever A and cap or bumper H may be the brakes may be at any time applied to the wheels by means of the brake-rod M and the chain N, operated after the usual manner.

The engineer would always have control over a train in which the cars, or a portion of them, were provided with these brakes. Desirous of stopping the train, he could put one brake on with the brake-rod and wheel, and thus cause the cars to bump together and set all the rest of the brakes and stop the train; or by reversing his engine, and thus causing the cars to bump, he can effect the same end.

It will be observed that it is only by means of the brake-rod M and chain N that the levers are operated to hold the brake-shoes continuously against the wheels, and that the brakes are operated by the contact of the cars only while the pressure of contact continues. Thus it will be seen that the engineer can, by reversing the engine and causing the cars to come in contact with each other, set all the brakes, and that he can at will start the train without being impeded by their action.

The breaking of wheel or axle or any accident that causes the cars to come in contact with each other will set all the brakes and stop the train with but little danger of further damage.

If the brake be applied to cars having no bumpers, the cap or bumper H may be applied to the draw-head of the car.

Having thus described our invention, we claim as new and desire to secure by Letters Patent—

1. The within-described car-brake, consisting of levers A, G, I, K, O, and T T, ratchet $a'$, spring $b$, pulley-frame C, sheave $d'$, pushing-bar D, chains F and N, cap or bumper H, guide L, brake-rod M, brake-shoes P P and $p'$ $p'$, and rods $s$ $s$, constructed and arranged substantially as herein shown and described.

2. In the construction of a car-brake, the combination of the levers A, G, and I, lug $h'$, pulley-frame C, sheave $d'$, pushing-bar D, chain F, and cap or bumper H, substantially as herein shown and described.

JAMES BENEDICT O'DONNELL.
WILLIAM JOSEPH DEVER.

Witnesses:
JOHN W. O'DONNELL,
DENNIS CROSBY.